United States Patent
Mudalige et al.

(10) Patent No.: US 10,288,745 B2
(45) Date of Patent: May 14, 2019

(54) METHODS AND SYSTEMS FOR OPTIMAL VEHICLE POSITIONING USING GLOBAL POSITIONING RECEIVERS FROM PARKED FLEET

(71) Applicant: GM GLOBAL TECHNOLOGY OPERATIONS LLC, Detroit, MI (US)

(72) Inventors: Upali P. Mudalige, Oakland Township, MI (US); Shuqing Zeng, Sterling Heights, MI (US); Curtis L. Hay, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 84 days.

(21) Appl. No.: 15/499,798

(22) Filed: Apr. 27, 2017

(65) Prior Publication Data

US 2018/0313960 A1 Nov. 1, 2018

(51) Int. Cl.
*G01S 19/46* (2010.01)
*G01S 19/04* (2010.01)
*H04L 29/08* (2006.01)
*G01S 19/05* (2010.01)

(52) U.S. Cl.
CPC ............. *G01S 19/46* (2013.01); *G01S 19/04* (2013.01); *G01S 19/05* (2013.01); *H04L 67/12* (2013.01)

(58) Field of Classification Search
CPC ........... G01S 19/46; G01S 19/04; H04L 67/12
See application file for complete search history.

(56) References Cited

U.S. PATENT DOCUMENTS 9,194,710 B1\* 11/2015 Iyer .................... G01C 21/26
2018/0114441 A1\* 4/2018 Marmet ................ G01C 21/30

\* cited by examiner

*Primary Examiner* — Basil T. Jos
(74) *Attorney, Agent, or Firm* — Lorenz & Kopf, LLP

(57) ABSTRACT

Methods and systems are provided for determining a vehicle position. In one embodiment, a method includes: receiving, by a processor of a rover vehicle, vehicle position data from one or more parked vehicles; receiving, by the processor of the rover vehicle, global positioning system data from a GPS receiver of the rover vehicle; and processing, by the processor of the rover vehicle, the vehicle position data and the global position system data to determine a position of the rover vehicle.

15 Claims, 4 Drawing Sheets

METHODS AND SYSTEMS FOR OPTIMAL VEHICLE POSITIONING USING GLOBAL POSITIONING RECEIVERS FROM PARKED FLEET

TECHNICAL FIELD

The technical field generally relates to vehicle positioning, and more particularly to methods and systems for determining vehicle positioning using global positioning system receivers from parked fleet.

BACKGROUND

An autonomous vehicle or semi-autonomous vehicle is a vehicle that is capable of sensing its environment and navigating with little or no user input. An autonomous or semi-autonomous vehicle senses its environment using sensing devices such as radar, lidar, image sensors, and the like. The autonomous vehicle or semi-autonomous vehicle further uses information from global positioning systems (GPS) technology, navigation systems, vehicle-to-vehicle communication, vehicle-to-infrastructure technology, and/or drive-by-wire systems to navigate the vehicle.

In order to accurately control the vehicle, a current position of the vehicle needs to be known. In particular, the current position within a lane of a road (within a meter of accuracy) is needed for control in some cases. In some instances, the information used to determine the current position is not available. For example, the resources that are used to generate the information may not be in vicinity of the vehicle.

Accordingly, it is desirable to provide improved methods and systems for determining a vehicle's position. It is further desirable to provide methods and system for determining a vehicle's position based on other vehicles in vicinity of the vehicle. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for determining a vehicle position. In one embodiment, a method includes: receiving, by a processor of a rover vehicle, vehicle position data from one or more parked vehicles; receiving, by the processor of the rover vehicle, global positioning system data from a GPS receiver of the rover vehicle; and processing, by the processor of the rover vehicle, the vehicle position data and the global position system data to determine a position of the rover vehicle.

In one embodiment, a system includes a first module that, by a processor, determines vehicle position data of a parked vehicle. The system further includes a second module that, by a processor, receives the vehicle position data, receives global positioning system data from a GPS receiver of a rover vehicle, and processes the vehicle position data and the global position system data to determine a position of the rover vehicle.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
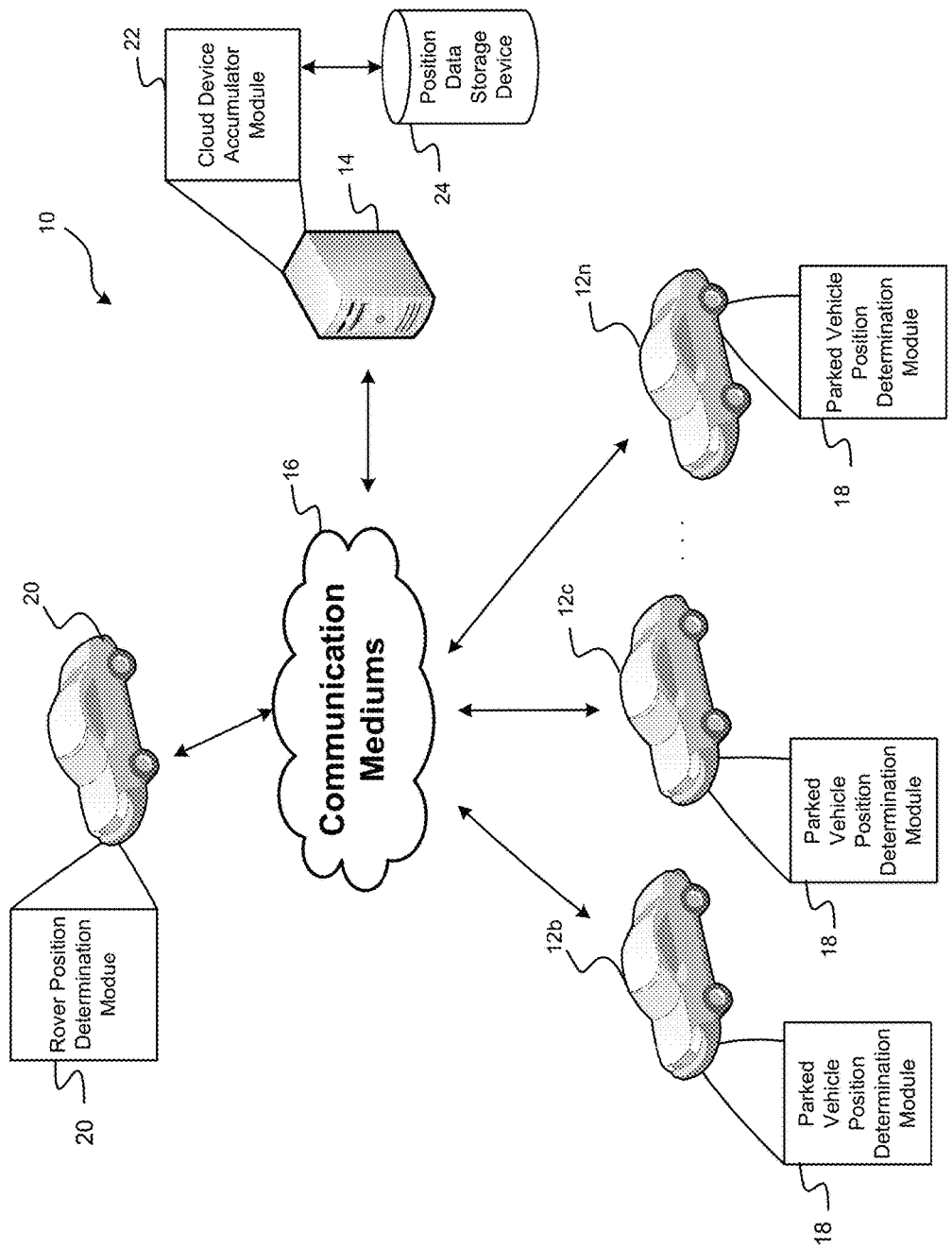
FIG. 1 is a functional block diagram of a vehicle positioning system that is associated with a plurality of vehicles in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of control systems, and that the system described herein is merely one example embodiment.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

With reference now to FIG. 1, an exemplary vehicle positioning system 10 is shown to include vehicles 12*a*-12*n* that communicate with each other and/or with a cloud device 14 over one or more short range and/or long range communication means 16. Although the vehicles 12*a*-12*n* are depicted as automobiles, the vehicles 12*a*-12*n* may be any vehicle type or a combination of vehicle types such as, but not limited to road vehicles, off-road vehicles, aircraft, watercraft, trains, motorcycles, electrical moving machines, etc. For exemplary purposes, the remainder of the disclosure will be discussed in the context of the vehicle positioning system 10 being associated with automobiles. Although the figures shown herein depict an example with certain arrangements of elements, additional intervening elements, devices, features, or components may be present in actual embodiments. It should also be understood that FIG. 1 is merely illustrative and may not be drawn to scale.

As shown, at least one of the vehicles 12a of the vehicle 12a-12n in the vehicle positioning system 10 is considered to be the "rover" or moving vehicle and the other vehicles 12b-12n are considered to be the "parked" or stationary vehicles. The parked vehicles 16b-16n each includes a parked position determination module 18. The rover vehicle 12a includes a rover position determination module 20.

In various embodiments, the parked position determination module 18 determines a position of the parked vehicle 12b-12n and communicates the position and other date to the other vehicles 12a-12n and/or to the cloud device 14. For example, the parked position determination module 18 determines the position based on a precise point positioning method and/or an analysis of global positioning system (GPS) data.

In various embodiments, the rover position determination module 20 determines a position of the rover vehicle based on the positions determined by the parked vehicles 12b-12n. For example, the rover position determination module 20 determines the position by downloading or receiving the determined positions from the parked vehicles 12b-12n.

In various embodiments, the cloud device 14 includes a cloud device accumulator module 22 that receives and accumulates position data and other data from the vehicles 12a-12n in a position data storage device 24. The cloud device accumulator module 22 then makes available the accumulated data for downloading and/or broadcasting.

Figure 2:
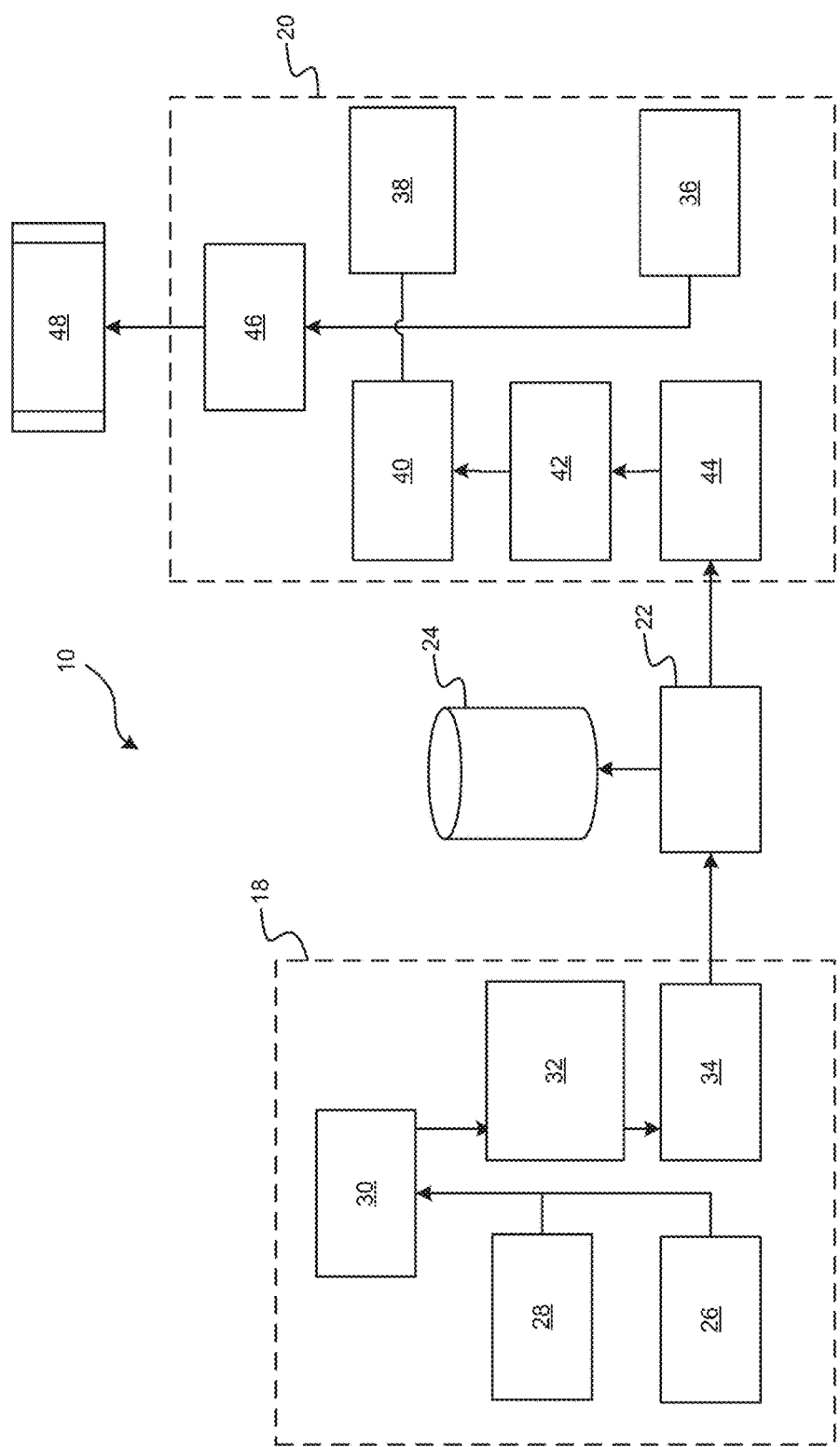
FIG. 2 is a functional block diagram of the vehicle positioning system in accordance with various embodiments.

With reference now to FIG. 2, a functional block diagram illustrates the modules of the vehicle positioning system 10 in more detail. As can be appreciated, various exemplary embodiments of the modules, according to the present disclosure, may include any number of modules and/or sub-modules. In various exemplary embodiments, the modules and sub-modules shown in FIG. 2 may be combined and/or further partitioned to similarly determine a position of the vehicles 12a-12n. In various embodiments, the parked position determination module 18 includes a vehicle data module 26, a vehicle GPS module 28, a position determination module 30, a compressor module 32, and a communication module 34.

The vehicle data module 26 provides vehicle data used in the position determination. In various embodiments, the vehicle data includes vehicle speed, a range or gear of the transmission, and/or other vehicle data that is indicative of whether the vehicle is parked or stationary. As can be appreciated, the vehicle data can be sensed and/or modeled.

The vehicle GPS module 28 provides GPS data used in the position determination. In various embodiments, the GPS module 28 includes a receiver that receives geolocation and time information from a satellite system (e.g., comprising four or more satellites in the line of sight of the vehicle 12b-12n). In various embodiments, the vehicle GPS module 28 includes a dual frequency receiver. In such embodiments, the GPS data includes code and phase information. In various other embodiments the vehicle GPS module 28 includes a single frequency receiver. In such embodiments, the GPS data includes geolocation coordinates.

The position determination module 30 receives the vehicle data and the GPS data and determines a position of the parked vehicle 12a-12n when it is determined that the vehicle is actually parked. The position determination module 30 determines the position based on whether the receiver is a dual frequency receiver or a single frequency receiver as will be described in more detail below with regard to FIG. 3.

The compression module 32 receives the determined position data, and the GPS data that is relied upon to make the determination and compresses the data such that it can be reasonably stored and/or communicated. For example, compression methods, such as, but not limited to, predictive coding compression methods, such as the methods described in U.S. Patent Publication No. 2010/0250132A1 or other methods may be used to compress the data. The communication module 34 then communicates the compressed data to the cloud device accumulator module 22 for storage in the position data storage device 24. In various embodiments, the data may be communicated, for example, periodically, based on a certain event, or at scheduled times. In various embodiments, the communication may be by way of a broadcast and/or an upload procedure.

As further shown in FIG. 2, in various embodiments, the rover position determination module 20 includes a vehicle data module 36, a vehicle GPS module 38, a base station selection module 40, a decompressor module 42, a communication module 44, and a position determination module 46.

The communication module 44 receives compressed data from, for example, the cloud device 14 (or directly from the parked vehicles 12b-12n), for example, based on a request, based on a certain event, or at scheduled times. The received communication can be by way of a broadcast and/or a download procedure. The decompressor module 42 receives the compressed data and decompresses the data such that it can be further processed. For example, decompression methods, such as, but not limited to, predictive coding methods or other methods may be used to decompress the data.

The base station selection module 40 receives the decompressed data and selects which of the data to make use of in the computation by the position determination module. For examples, the selection is based on the quality of the base station as indicated by the GPS signal reception condition, the capability of the receiver, namely dual frequency or single frequency, how long the vehicle is parked, and further based on whether the position determination process in parked vehicle has reached an optimal condition.

The vehicle data module 36 provides vehicle data used in the position determination. In various embodiments, the vehicle data includes data indicative of the vehicle kinematics including vehicle speed, inertial measurement unit data, and/or other data. As can be appreciated, the vehicle data can be sensed and/or modeled.

The vehicle GPS module 38 provides GPS data used in the position determination including (but not limited to) satellite pseudorange measurements, range rate measurements, Doppler, and carrier phase. In various embodiments, the GPS module 38 includes a receiver that receives satellite range measurements and time information from a satellite system. In various embodiments the data includes at least phase and code information.

The position determination module 46 receives the vehicle data, the GPS data, and the decompressed parked vehicle position data for the selected base set and determines a position of the rover vehicle 12a. The position determination module 46 determines the position by aligning the observations of the rover vehicle GPS module with the observations from the parked vehicles as will be described in more detail below with regard to FIG. 4. The position determination module 48 provides the determined position as, for example, a WGS84 coordinates 48, or using some other coordinate system.

Figure 3:
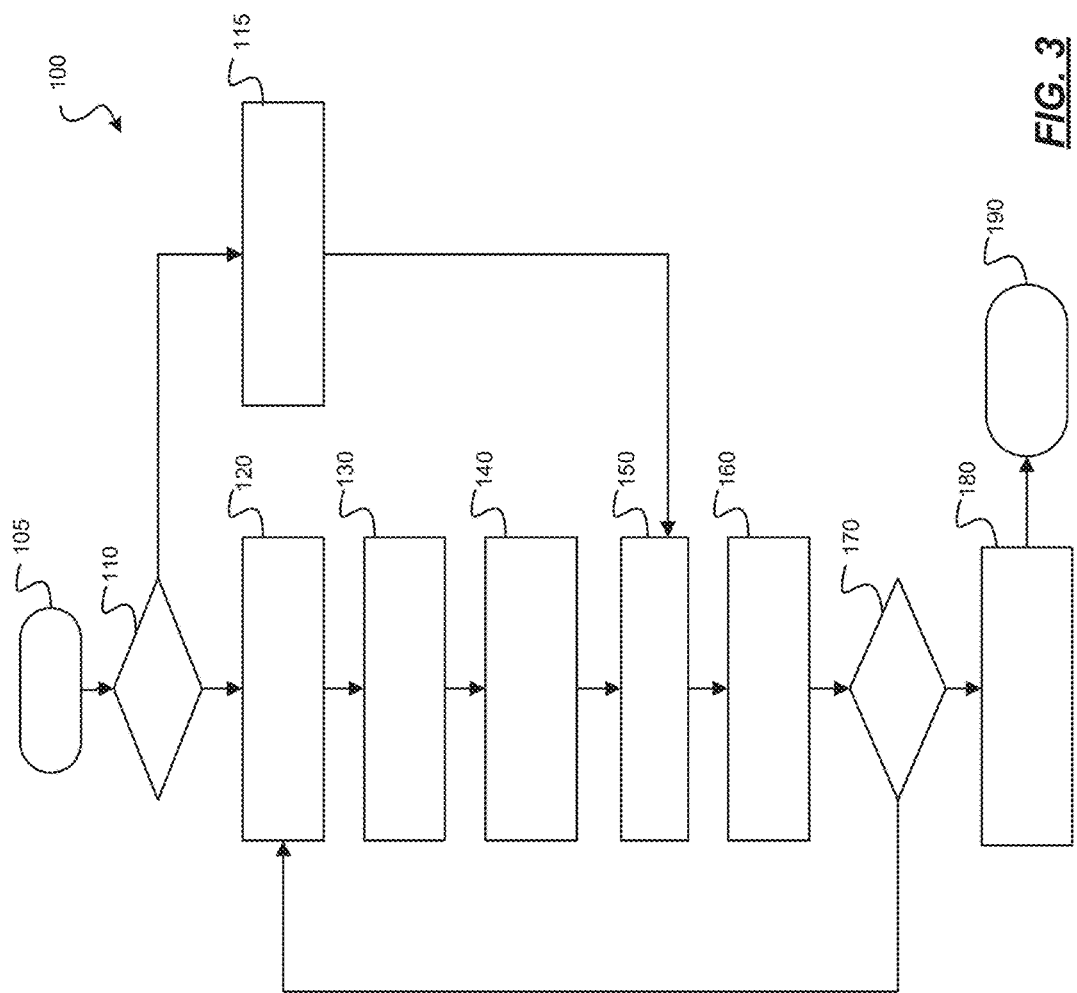
FIGS. 3 and 4 are flowcharts illustrating methods of the vehicle positioning system in accordance with various embodiments.

With reference now to FIG. 3, and with continued reference to FIGS. 1 and 2, a flowchart illustrates a method 100 for determining the position of the parked vehicle 12b-12n. The method 100 can be implemented in connection with the parked position determination module 18 of FIG. 2 in accordance with various exemplary embodiments. As can be appreciated in light of the disclosure, the order of operation within the method 100 is not limited to the sequential execution as illustrated in FIG. 3, but may be performed in one or more varying orders as applicable and in accordance with the present disclosure. As can further be appreciated, the method 100 of FIG. 3 may be enabled to run continuously, may be scheduled to run at predetermined time intervals during operation of the parked vehicle 12a-12n, and/or may be scheduled to run based on predetermined events.

In various embodiments, the method 100 may begin at 105. It is determined whether the receiver of the GPS module 28 includes a dual frequency receiver or a single frequency receiver at 110. If the receiver is a single frequency receiver at 110, a vehicle position is determined from the GPS data by recursively averaging the position (e.g. the GPS coordinates) at 115.

If, at 110, the receiver is a dual frequency receiver, the vehicle position is determined based on precise point positioning at 120-140. In particular, at 120 precise orbit information is downloaded from a reliable source (e.g., websites or other commercial datastores). The orbit information includes orbit, clock products, and tropospheric parameters with up to a centimeter of accuracy. Thereafter, at 130, ionosphere-free combinations are computed using code and phase measurements. For example, the ionosphere-free combinations are computed by:

$$P_{IF} = \frac{f_1^2 P_{L1} - f_2^2 P_{L2}}{f_1^2 - f_2^2} = \rho - cdT + d_{trop} \tag{1}$$

$$\Phi_{IF} = \frac{f_1^2 \Phi_{L1} - f_2^2 \Phi_{L2}}{f_1^2 - f_2^2} = \rho - cdT + d_{trop} + \frac{cf_1 N_1 - cf_2 N_2}{f_1^2 - f_2^2}$$

Where $f_1$ and $f_2$ represent GPS L1 and L2 frequencies. $P_{Li}$ and $\Phi_{Li}$ represent the code and phase observations for frequency $L_i$. $N_i$ represents the ambiguity term for $L_i$, for i=1, 2. $\rho$ represents the true geometry range between the receiver and the satellite. c represents the speed of light. dT represents the receiver's clock offset. Given the precise orbit position for three satellites $p^{(1)}$, $p^{(2)}$, and $p^{(3)}$, the phase ambiguity term $a^{(i)}$ for satellites i=1, 2, 3 is provided as:

$$a^{(i)} = \frac{cf_1 N_1^{(i)} - cf_2 N_2^{(i)}}{f_1^2 - f_2^2} \tag{2}$$

Thereafter, at 140, a position determination is made using the code and phase measurements by:

$$\arg\min_{p,a^{(i)},dT} \sum_{t=1}^{T} \sum_{i=1}^{3} \frac{\|P_{IF}^{(i)}(t) - \rho^{(i)}(p) - cdT + d_{trop}\|}{\sigma_P^2} + \frac{\|\Phi_{IF}^{(i)}(t) - \rho^{(i)}(p) - cdT + d_{trop} + a^{(i)}\|}{\sigma_\Phi^2} \tag{3}$$

Where, $P^{(i)}_{IF}(t)$ and $\Phi^{(i)}_{IF}(t)$ represent the code and the phase observations of satellite i at time t. $a^{(i)}$ represents the ambiguity for the i-th satellite. $\rho^{(i)}(p)$ represents the true geometrical range from the i-th satellite to the receiver, expressed as a function of the unknown rover position p.

Once the position determination is complete, the position is uploaded/broadcast to the cloud device 14 or stored locally for direct vehicle communication at 150. Optionally, the GPS observation data is compressed and stored or communicated with the position at 160. If the vehicle 12b-12n remains parked at 170, the method continues at 120. The process of obtaining the GPS information and determining the position is continued until the vehicle 12b-12n is no longer parked at 170 (or some other condition is met). Once the vehicle 12b-12n is no longer parked, a request can be generated to delete the information uploaded/broadcast to the cloud device 14 at 180. Thereafter, the method may end at 190.

Figure 4:
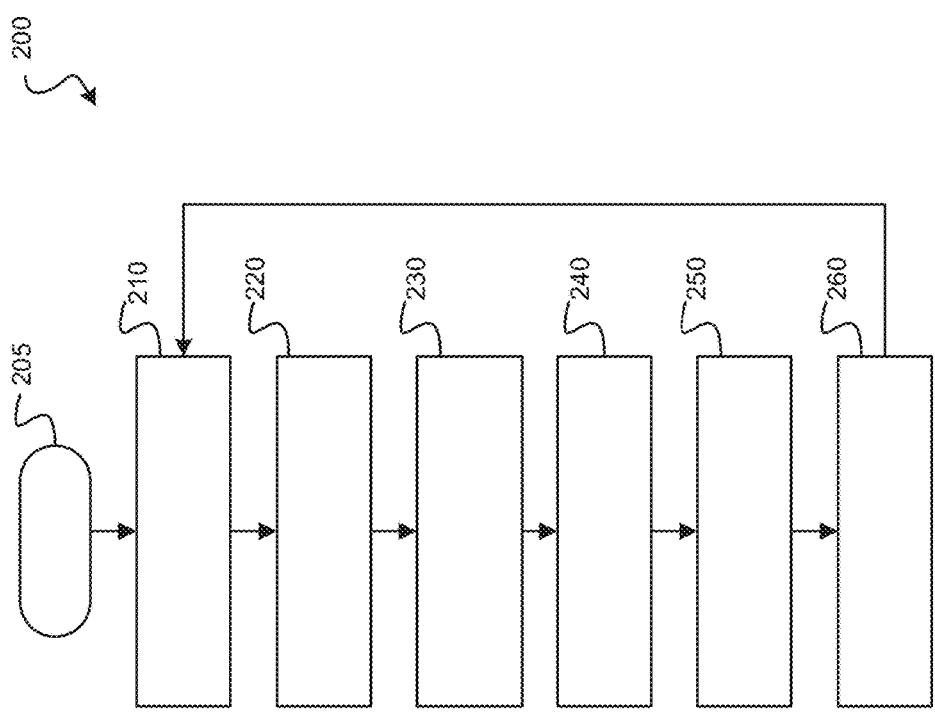

With reference now to FIG. 4, and with continued reference to FIGS. 1 and 2, a flowchart illustrates a method 200 associated with determining the rover vehicle position in accordance with various embodiments. The method 200 can be implemented in connection with the rover position determination module 20 of FIG. 2 in accordance with various exemplary embodiments. As can be appreciated in light of the disclosure, the order of operation within the method 200 is not limited to the sequential execution as illustrated in FIG. 4, but may be performed in one or more varying orders as applicable and in accordance with the present disclosure. As can further be appreciated, the method 200 of FIG. 4 may be enabled to run continuously, may be scheduled to run at predetermined time intervals during operation of the rover vehicle 12a, and/or may be scheduled to run based on predetermined events.

In various embodiments, the method may begin at 205. The available base set of parked vehicles is selected at 210 for example, as discussed above. The observation data is collected from the base set (e.g., either directly from the parked vehicles 12a-12n or from the cloud device 14) at 220. The observation data is decompressed at 230. The rover position is then determined by aligning the rover position with the observations of the parked vehicles 12a-12n in the base set at 240-260. For example, at 240, the rover's observation is aligned with the parked vehicle's observation to form double differences by:

$$P = P^{(i)} - P^{(j)} - P_k^{(i)} + P_k^{(j)} = \rho$$

$$\Phi = \Phi^{(i)} - \Phi^{(j)} - \Phi_k^{(i)} + \Phi_k^{(j)} = \rho + a$$

$$\rho = \rho^{(i)} - \rho^{(j)} - \rho_k^{(i)} + \rho_k^{(j)} \tag{4}$$

Where P, $\Phi$, and $\rho$ represent double differences for code observation, phase observation, and true geometrical range, respectively. $*^{(i)}k$ represent the quantity for the k-th base and the i-th satellite. $*^{(i)}$ denotes the quantity for the rover and the i-th satellite. a represents the consolidated ambiguity term.

Thereafter, at 250, the rover's position is determined using recursive least-squares $$\arg\min_{P} \sum_{i=1}^{3} \frac{\|P_l - \rho_l(p)\|}{\sigma_P^2} + \frac{\|\Phi_l - \rho_l(p) - a_l\|}{\sigma_\Phi^2} \tag{5}$$

Where $P_l$ and $\Phi_l$ are the l-th double difference for code and phase, respectively. $a_l$ represents $\Phi_l$ ambiguity term.

The current vehicle position is then extrapolated using the vehicle kinematics at 260. For example, a dead reckoning strategy using the IMU data can be used when the vehicles' GPS signal reception is not ideal (e.g., in an urban canyon), or the base station correction signal is not current (e.g., aged 1 second early), the current rover vehicle's position is extrapolated using IMU data with respect to the one-second-age corrected position. In various embodiments, the method continues as long as the vehicle 12*a* is moving.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of determining a vehicle position, comprising:
   receiving, by a processor of a rover vehicle, vehicle position data from one or more parked vehicles;
   receiving, by the processor of the rover vehicle, global positioning system data from a GPS receiver of the rover vehicle; and
   processing, by the processor of the rover vehicle, the vehicle position data and the global position system data to determine a position of the rover vehicle,
   wherein the processing comprises:
   aligning the global position system data with the vehicle position data to form double differences;
   determining a first position using recursive least squares and the double differences; and
   extrapolating the position of the rover vehicle from the first position based on vehicle kinematics.

2. The method of claim 1, wherein the vehicle position data from one or more parked vehicles includes a determined position of the parked vehicle, and GPS observation data.

3. The method of claim 2, wherein the determined position is based on a recursive average of coordinates from a GPS receiver.

4. The method of claim 2, wherein the determined position is based on a code and phase measurements.

5. The method of claim 2, wherein the GPS observation data includes code and phase information.

6. The method of claim 1, further comprising determining that a vehicle is parked, and wherein the vehicle position data includes a position of the vehicle that is parked.

7. The method of claim 6, further comprising determining the position of the vehicle that is parked based on precise point positioning.

8. The method of claim 6, further comprising determining the position of the vehicle that is parked based on an average of GPS position coordinates.

9. A system for determining a vehicle position, comprising:
   a first module that, by a processor, determines that a vehicle is parked and that determines vehicle position data of the parked vehicle; and
   a second module that, by the processor, receives the vehicle position data, receives global positioning system data from a GPS receiver of a rover vehicle, and processes the vehicle position data and the global position system data to determine a position of the rover vehicle,
   wherein the processing comprises:
   aligning the global position system data with the vehicle position data to form double differences;
   determining a first position using recursive least squares and the double differences; and
   extrapolating the position of the rover vehicle from the first position based on vehicle kinematics.

10. The system of claim 9, wherein the vehicle position data from one or more parked vehicles includes a determined position of the parked vehicle, and GPS observation data.

11. The system of claim 10, wherein the first module determines the determined position based on a recursive average of coordinates from a GPS receiver.

12. The system of claim 10, wherein the first module determines the determined position based on a code and phase measurements.

13. The system of claim 10, wherein the GPS observation data includes code and phase information.

14. The system of claim 9, wherein the vehicle position data includes a position of the parked vehicle that is determined based on precise point positioning.

15. The system of claim 9, wherein the vehicle position data includes a position of the parked vehicle that is determined based on an average of GPS position coordinates.

* * * * *